US007680751B2

(12) United States Patent
Parthasarathy et al.

(10) Patent No.: US 7,680,751 B2
(45) Date of Patent: Mar. 16, 2010

(54) NEURAL NETWORK BASED REFRIGERANT CHARGE DETECTION ALGORITHM FOR VAPOR COMPRESSION SYSTEMS

(75) Inventors: Girija Parthasarathy, Maple Grove, MN (US); Lawrence A. Lem, Redondo Beach, CA (US); Brian G. Hosler, Georgetown (CA); Sunil K. Menon, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 947 days.

(21) Appl. No.: 11/444,092

(22) Filed: May 31, 2006

(65) Prior Publication Data

US 2007/0277537 A1    Dec. 6, 2007

(51) Int. Cl.
*G05B 13/00* (2006.01)
(52) U.S. Cl. ............... 706/23; 706/14; 706/15; 706/20; 62/129; 62/132; 62/172; 62/401; 700/275; 700/276; 700/281; 701/100; 701/106
(58) Field of Classification Search ............ 706/14–23; 62/13, 129, 132, 231, 172, 401; 700/275, 700/276, 281, 282, 299, 300; 703/2, 6, 9; 701/100, 106

See application file for complete search history.

(56) References Cited

U.S. PATENT DOCUMENTS

| | | |
|---|---|---|
| 5,333,240 A | 7/1994 | Matsumoto et al. |
| 5,860,286 A | 1/1999 | Tulpule |
| 5,907,953 A | 6/1999 | Kang et al. |
| 6,505,475 B1 | 1/2003 | Zugibe et al. |
| 6,571,566 B1 | 6/2003 | Temple et al. |
| 6,622,500 B1 | 9/2003 | Archibald et al. |

(Continued)

FOREIGN PATENT DOCUMENTS

EP    0883048 A1    9/1998

(Continued)

OTHER PUBLICATIONS www.en.wikipedia.org/wiki/Average, Aug. 2005, as retrieved from the wayback machine (www.web.archive.org), pp. 1-2.*

(Continued)

*Primary Examiner*—David R Vincent
*Assistant Examiner*—Omar F Fernandez Rivas
(74) *Attorney, Agent, or Firm*—Ingrassia Fisher & Lorenz, P.C.

(57) ABSTRACT

Methods and apparatus are provided for determining refrigerant charge in a vapor compressor system (VCS) of an aircraft. The methods and apparatus comprise the following steps of, and/or means for, generating a data set from historical data representative of a plurality of VCS operating conditions over time, identifying one or more steady-state data points in the generated data set, forming a revised data set that includes at least the steady-state data points, using principal components analysis (PCA) to derive values for a plurality of minimally correlated input variables, supplying the derived values for the plurality of minimally correlated input variables and the corresponding values for the VCS refrigerant charge in the revised data set to a nonlinear neural network model, and deriving a simulator model characterizing a relationship between the plurality of minimally correlated input variables and the VCS refrigerant charge.

17 Claims, 9 Drawing Sheets

U.S. PATENT DOCUMENTS

| | | |
|---|---|---|
| 6,948,331 B1 * | 9/2005 | Ho .............................. 62/401 |
| 7,472,100 B2 * | 12/2008 | Volponi et al. ................ 706/45 |
| 2001/0000407 A1 | 4/2001 | Ichishi et al. |
| 2003/0055798 A1 | 3/2003 | Hittle et al. |
| 2003/0160103 A1 | 8/2003 | Guo |
| 2004/0060311 A1 | 4/2004 | Imoto |
| 2004/0176901 A1 * | 9/2004 | Uluyol et al. ............... 701/100 |
| 2004/0254686 A1 | 12/2004 | Matsui et al. |
| 2005/0061008 A1 | 3/2005 | Ben-Nakhi et al. |
| 2005/0209767 A1 * | 9/2005 | Kim et al. .................. 701/100 |
| 2006/0059924 A1 | 3/2006 | Horan et al. |
| 2006/0059925 A1 * | 3/2006 | Horan et al. ................. 62/129 |
| 2007/0288409 A1 * | 12/2007 | Mukherjee et al. ............ 706/25 |
| 2009/0012653 A1 * | 1/2009 | Cheng et al. ................ 700/287 |

FOREIGN PATENT DOCUMENTS

JP    09113077    5/1997

OTHER PUBLICATIONS

Kashiwagi N., Tobi T.; Heating and Cooling Load Prediction Using a Neural Network System, Oct. 25-29, 1993, New York, IEEE, US, vol. 1, 1993, pp. 939-942, XP002078901.

PCT Search Report, PCTUS2007069621 dated Feb. 4, 2008.

* cited by examiner

NEURAL NETWORK BASED REFRIGERANT CHARGE DETECTION ALGORITHM FOR VAPOR COMPRESSION SYSTEMS

TECHNICAL FIELD

The present invention generally relates to vapor compression systems for aircraft, and more particularly relates to a method and apparatus for determining refrigerant charge in a vapor compression system.

BACKGROUND

Vapor compression systems (VCS) in aircraft are used to supply refrigerant cooled air, which is used primarily for cooling avionic systems. The VCS is generally a closed-loop system, and may include a ram-air cooled condenser, an evaporator with a draw through fan, a centrifugal compressor driven by an electric motor, and a flash subcooler heat exchanger to improve overall system efficiency.

A low refrigerant charge level can result in decreased VCS system performance, particularly at higher heat loads. It may thus be appreciated that it is generally desirable to determine refrigerant charge level. However, the determination of refrigerant charge level can be difficult. This difficulty arises because the VCS operation is typically complex, with many interacting control loops. Generally the refrigerant charge level in the VCS is determined by indirect methods, such as inference from various system operating parameters. However, such methods to date have provided less than optimal results, for example due to a lack of a sufficient number of input variables, and/or due to substantial collinearity among input variables.

Accordingly, there is a need for an improved method and apparatus for determining refrigerant charge level in a VCS. The present invention addresses at least this need.

BRIEF SUMMARY OF THE INVENTION

A method is provided for determining refrigerant charge in a vapor compressor system (VCS) of an aircraft. In one embodiment, and by way of example only, the method comprises the steps of generating a data set from historical data representative of a plurality of VCS operating conditions over time, identifying one or more steady-state data points in the generated data set, forming a revised data set that includes at least the steady-state data points, using principal components analysis (PCA) to derive values for a plurality of minimally correlated input variables from the values for the plurality of VCS operating variables in the revised data set, supplying the derived values for the plurality of minimally correlated input variables and the corresponding values for the VCS refrigerant charge in the revised data set to a nonlinear neural network model, and deriving a simulator model characterizing a relationship between the plurality of minimally correlated input variables and the VCS refrigerant charge. The generated data set comprises a plurality of data points, each data point comprising one or more values for a plurality of VCS operating variables reflecting operation of the VCS over a specific time period and corresponding to a specific set of operating conditions, and corresponding values for VCS refrigerant charge over the same time period. The steady-state data points correspond to steady-state operation of the VCS.

In another embodiment, and by way of example only, the method comprises the steps of generating a data set from historical data representative of a plurality of VCS operating conditions over time, identifying one or more steady-state data points in the generated data set, forming a revised data set that includes at least the steady-state data points, dividing the steady-state data points according to particular ranges of VCS operating conditions, thereby creating a revised data subset for each range of VCS operating conditions, calculating average values for the plurality of VCS operating variables for each data subset, using principal components analysis (PCA) to derive values for a plurality of minimally correlated input variables from the average values for the plurality of VCS operating variables in the revised data set, supplying the derived values for the plurality of minimally correlated input variables and the corresponding values for the VCS refrigerant charge in the revised data set to a nonlinear neural network model, and deriving a simulator model characterizing a relationship between the plurality of minimally correlated input variables and the VCS refrigerant charge. The generated data set comprises a plurality of data points, each data point comprising one or more values for a plurality of VCS operating variables reflecting operation of the VCS over a specific time period and corresponding to a specific set of operating conditions, and corresponding values for VCS refrigerant charge over the same time period. The steady-state data points correspond to steady-state operation of the VCS.

A system is shown for a system for determining the refrigerant charge in a vapor compressor system (VCS) of an aircraft. In one embodiment, and by way of example only, the system comprises means for generating a data set from historical data representative of a plurality of VCS operating conditions over time, means for identifying one or more steady-state data points in the generated data set, means for forming a revised data set that includes at least the steady-state data points, means for using principal components analysis (PCA) to derive values for a plurality of minimally correlated input variables from the values for the plurality of VCS operating variables in the revised data set, means for supplying the derived values for the plurality of minimally correlated input variables and the corresponding values for the VCS refrigerant charge in the revised data set to a nonlinear neural network model, and means for deriving a simulator model characterizing a relationship between the plurality of minimally correlated input variables and the VCS refrigerant charge. The generated data set comprises a plurality of data points, each data point comprising one or more values for a plurality of VCS operating variables reflecting operation of the VCS over a specific time period and corresponding to a specific set of operating conditions, and corresponding values for VCS refrigerant charge over the same time period. The steady-state data points correspond to steady-state operation of the VCS.

In another embodiment, and by way of example only, a program product is shown, comprising a program and a computer-readable signal bearing media bearing the program. The program is configured to determine a refrigerant charge in a vapor compressor system (VCS) of an aircraft via a simulator model derived from a data set from historical data representative of a plurality of VCS operating conditions over time, utilizing principal components analysis (PCA) for deriving minimally correlated input variables, and further utilizing a nonlinear neural network model.

In another embodiment, and by way of example only, an apparatus is shown comprising a processor, a memory coupled to the processor, and a program residing in memory and being executed by the processor. The program is configured to provide a model for determining a refrigerant charge in a vapor compressor system (VCS) of an aircraft via a model through at least the following steps: generating a data set from historical data representative of a plurality of VCS operating conditions over time, the generated data set comprising a plurality of data points, each data point comprising one or more values for a plurality of VCS operating variables reflecting operation of the VCS over a specific time period, and corresponding values for VCS refrigerant charge over the same time period; identifying one or more steady-state data points in the generated data set, each steady-state data point corresponding to steady-state operation of the VCS; forming a revised data set that includes at least the steady-state data points; using principal components analysis (PCA) to derive values for a plurality of minimally correlated input variables from the values for the plurality of VCS operating variables in the revised data set; supplying the derived values for the plurality of minimally correlated input variables, and the corresponding values for the VCS refrigerant charge in the revised data set, to a nonlinear neural network model; and deriving a simulator model characterizing a relationship between the plurality of minimally correlated input variables and the VCS refrigerant charge.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
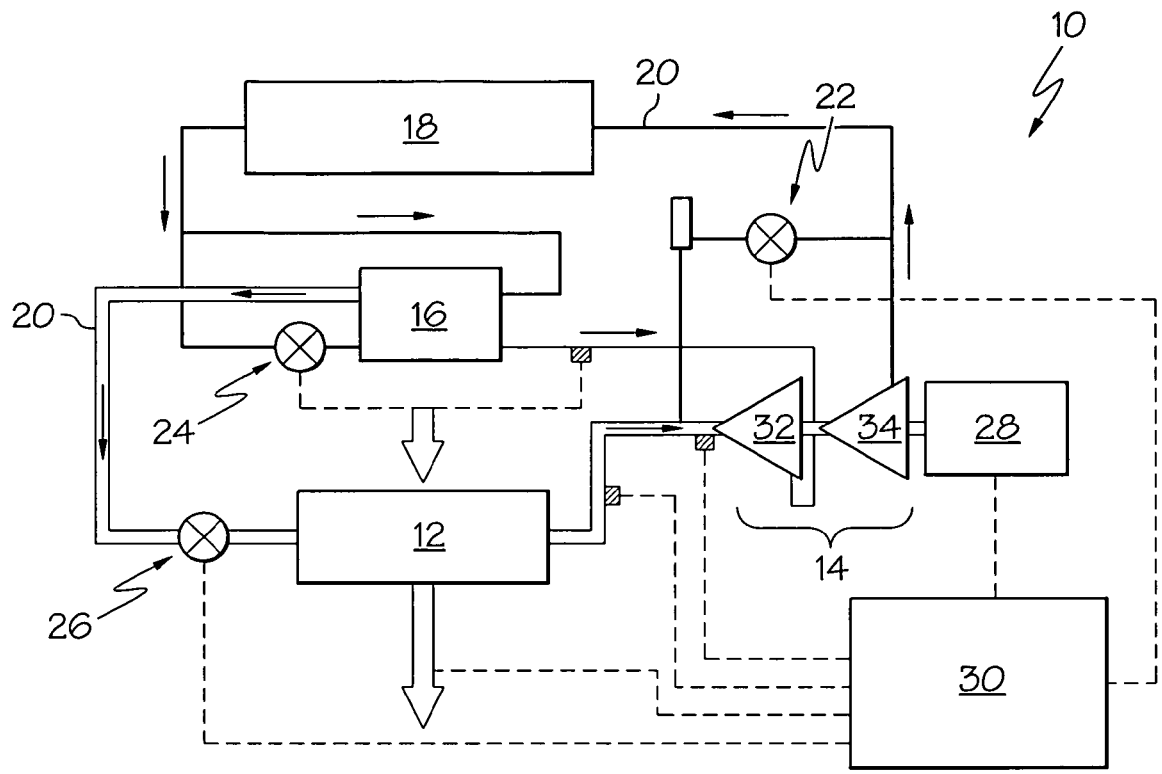
FIG. 1 is a schematic representation of an embodiment of an exemplary vapor compression system (VCS) for aircraft from the prior art.

FIG. 1 depicts an embodiment of a known vapor compression system (VCS) 10 for aircraft. The depicted VCS 10 has an evaporator 12, a compressor 14, a flash subcooler 16, a condenser 18, refrigerant lines 20, a surge valve 22, a thermal expansion valve 24, and a refrigerant expansion valve 26. The VCS 10 components are operated by a motor 28 and a controller 30.

In conditions requiring maximum cooling, refrigerant enters the evaporator 12 as a low-temperature mixture of liquid and vapor, and flows through the evaporator 12. In this section of the VCS 10, which is generally referred to as the low-pressure side, the pressure remains essentially constant. While in the evaporator 12, the liquid portion of the refrigerant evaporates as it absorbs heat from return air. The refrigerant exits the evaporator 12 as a superheated vapor, and then flows to the compressor 14. Flow of the superheated vapor is regulated by the surge valve 22, in order to prevent a surge with the compressor 14.

As shown, the compressor 14 has two stages, namely a first stage 32 and a second stage 34, although it will be appreciated that the compressor 14 can have a different number of stages. The superheated vapor exiting the evaporator 12 enters the first stage 32 of the compressor 14. Gas from the flash subcooler 16 then mixes with the flow from the evaporator 12 before entering the second stage 34 of the compressor 14. The compressor 14 compresses the flow to its highest pressure corresponding to the condensing temperature of the VCS 10. On this high pressure side of the VCS 10, the pressure remains substantially constant between the compressor 14, the condenser 18, and the flash subcooler 16.

The hot vapor exits the second stage 34 of the compressor 14 and then flows through the refrigerant lines 20 to the condenser 18, where the refrigerant is fully condensed and subcooled as it rejects heat to the ram air. The liquid refrigerant then exits the condenser 18 and flows through the refrigerant lines 20 to the flash subcooler 16. The flash subcooler 16 further subcools the refrigerant, by (i) expanding a small portion of the total flow and (ii) allowing the refrigerant to flow through cold side passages of the flash subcooler 16. The expanded flow absorbs heat, becoming a superheated gas. The superheated gas is modulated by the thermal expansion valve 24, and then flows back to the second stage 34 of the compressor 14. Meanwhile, the liquid portion of the refrigerant is further subcooled and flows to the refrigerant expansion valve 26, where the refrigerant expands into a two-phase mixture. The two-phase mixture then enters the evaporator 12, and the cycle repeats.

It will be appreciated that FIG. 1 depicts only one particular embodiment of a vapor compression system, and that the VCS 10 can take any one of numerous different configurations. Regardless of the particular configuration of the VCS 10, the nature of the VCS 10 operation and the interacting control loops make it difficult to determine the refrigerant charge level of the VCS 10 at any given time.

Figure 2:
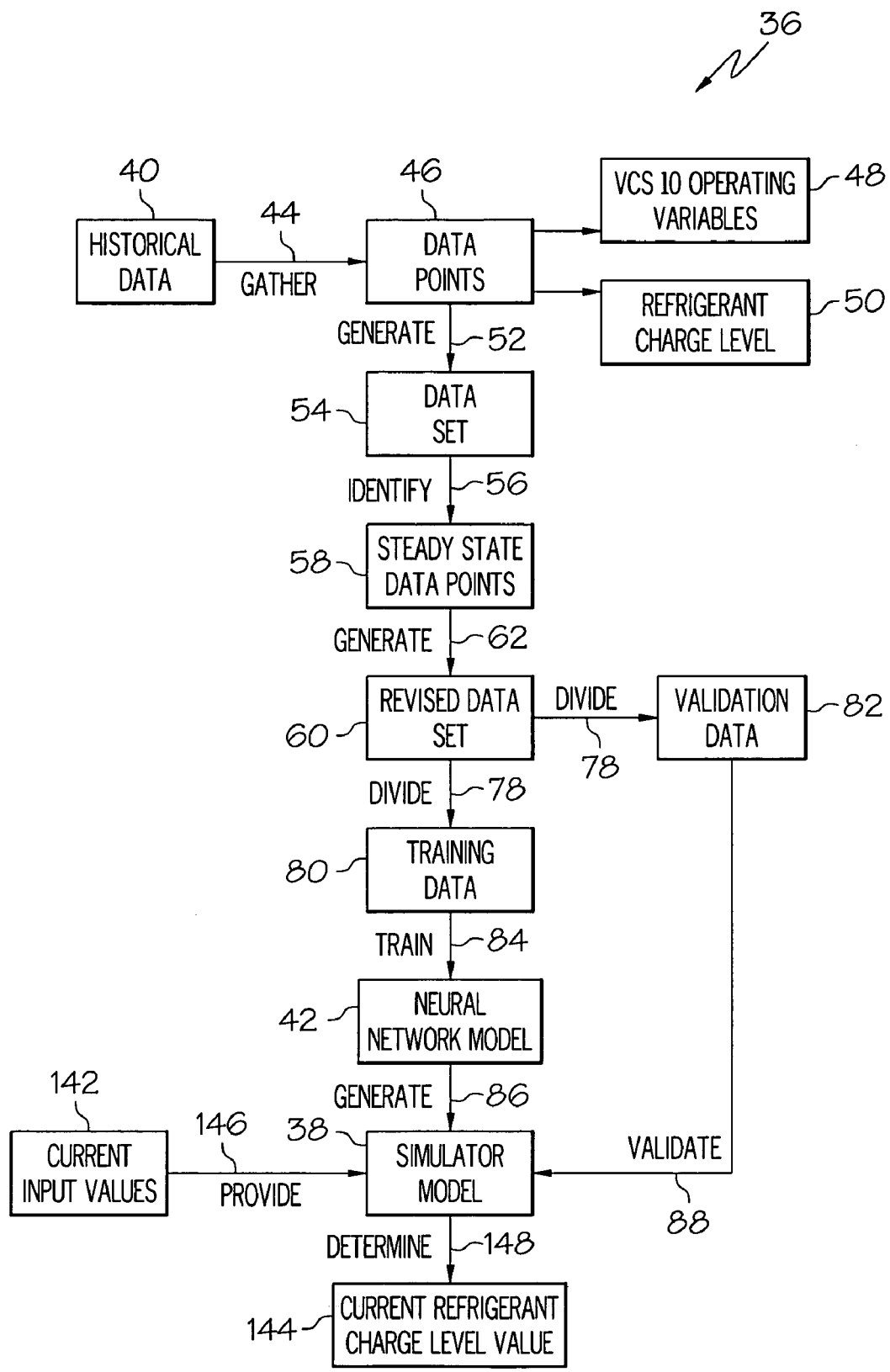
FIG. 2 is a flowchart depicting an embodiment of a process for generating a simulator model for determining refrigerant charge level in a VCS, and for validating and using the simulator model in determining refrigerant charge level.

Turning now to FIG. 2, an exemplary embodiment of a process 36 is shown for generating a simulator model 38 for determining refrigerant charge level in a VCS 10 using historical data 40 and a nonlinear neural network model 42, and for validating and using the simulator model 38. The process 36 comprises a first step 44, in which data points 46 are gathered from the historical data 40 representative of a plurality of VCS 10 operating conditions over time.

Preferably each data point 46 comprises (i) values for a plurality of VCS 10 operating variables 48 reflecting operation of the VCS 10 over a specific time period corresponding to a specific set of operating conditions; and (ii) corresponding values for VCS 10 refrigerant charge level 50 over the same time period. The plurality of VCS 10 operating variables 48 may include, among other possible variables, motor speed, motor power, compressor inlet temperature (TCPI), condenser outlet temperature (TCDO), evaporator outlet temperature (TEFO), condenser ram inlet temperature (TCDRI), compressor inlet pressure (PCPI), compressor outlet pressure (PCPO), subcooling temperature, and evaporator inlet temperature (TEVI).

Preferably each data point 46 comprises corresponding values for each of the VCS 10 operating variables 48 and the corresponding refrigerant charge level 50 for a specific time period, so that the data points 46 represent more accurate and meaningful relationships between the VCS 10 operating variables 48 and the VCS refrigerant charge level 50. However, it will be appreciated by one of skill in the art that in some situations values may be unavailable for one or more of the VCS 10 operating variables 48 in a particular data point 46, in which case the data point 46 may take a different configuration with less than all of the variable values.

It will also be appreciated that the historical data 40 may be obtained in any one of a number of different manners. For example, the historical data 40 may be obtained from sensor records of prior operations of a VCS 10, and/or through prior studies or literature in the field. Historical data 40 may include, by way of example only, controller data and/or lab instrumentation data. It will be appreciated that, where different types of data are involved, data interpolation or other methods may be used to match up data points 46 with corresponding time periods. However, regardless of the particular configuration of the data points 46 and the historical data 40, the data points 40 can be used to generate the simulator model 38, through the steps described herein.

In step 52, a data set 54 is generated by assembling the various data points 46. The data set 54 comprises the various data points 46 of the historical data 40. Next, in step 56, the data set 54 is analyzed so as to identify those data points 46 which correspond with steady-state operation of the VCS 10—such data points 46 are identified in this step as steady-state data points 58. A revised data set 60 is then generated in step 62, containing the steady-state data points 58.

Figure 3:
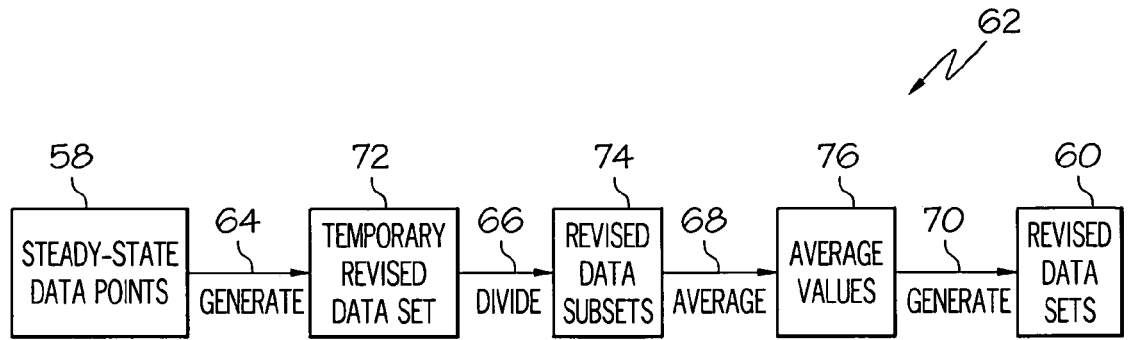
FIG. 3 is a flowchart depicting, in more detail, an embodiment of a portion of the process of FIG. 2, namely generating a revised data set.

In one preferred embodiment, step 62, generating the revised data set, includes various sub-steps 64, 66, 68, and 70, as set forth in FIG. 3. In step 64, the steady-state data points 58 are used to generate a temporary revised data set 72, which preferably includes solely the steady-state data points 58. Next, in step 66, the steady-state data points 58 in the temporary revised data set 72 are divided according to particular ranges of VCS 10 operating conditions, thereby creating various revised data subsets 74. Preferably step 66 will yield a revised data subset 74 for each of a plurality of VCS 10 operating conditions or ranges thereof, with each data subset 74 comprising the steady-state data points 58 corresponding to such a VCS 10 operating condition or range of conditions. Next, in step 68, the values for each of the variables within a given revised data subset 74 are averaged for each of the steady-state data points 58 within the given revised data subset 74, yielding average values 76. Step 68 is preferably conducted for each of the revised data subsets 74. Therefore, step 68 will preferably result in average values 76 for each of the VCS 10 operating variables 48 and for the refrigerant charge level 50, for each of the revised data subsets 74. Then, in step 70, the average values 76 for each of the revised data subsets 74 are used to generate the revised data set 60.

Next, and returning back to FIG. 2, in step 78 the revised data set 60 is divided into training data 80 and validation data 82. In step 84, the training data 80 is used to train a neural network model 42, which will in turn be used in step 86 to generate the simulator model 38. Next, the validation data 82 can be used in step 88 to test and validate the simulator model 38, as will be described in greater detail in connection with FIGS. 9 and 10 further below.

Figure 4:
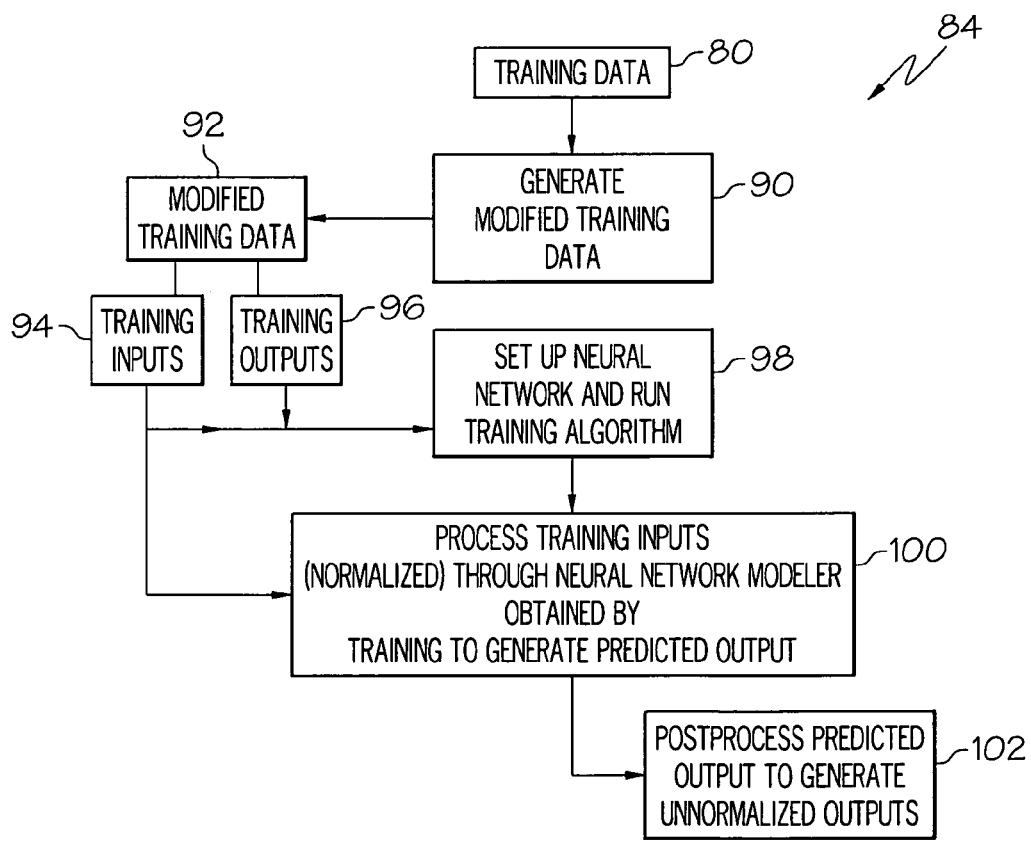
FIG. 4 is a flowchart depicting, in more detail, an embodiment of a portion of the process of FIG. 2, namely training a neural network model.

Turning now to FIG. 4, a flowchart is provided for one embodiment of step 84 for training the neural network model 42. First, in step 90, modified training data 92 is generated, which preferably includes normalized training inputs 94 and normalized training outputs 96. The modified training data 92 will subsequently be processed through the neural network model 42 in steps 98 and 100, as will be described in greater detail later below. Before doing so, however, a more detailed description as to how the modified training data 92 are generated will be provided.

Figure 5:
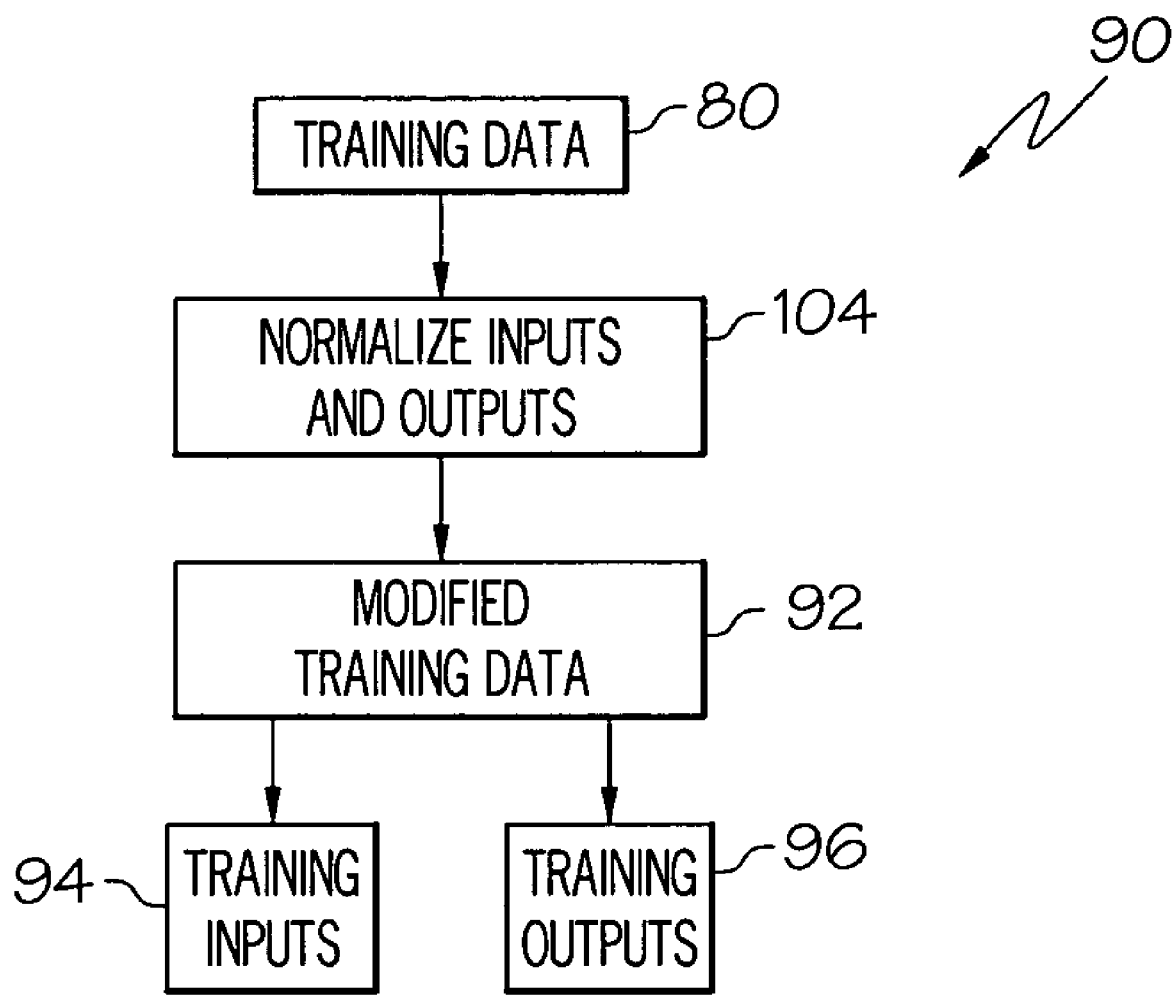
FIG. 5 is a flowchart depicting, in more detail, an embodiment of a portion of the process of FIG. 4, namely generating modified training data.
Figure 6:
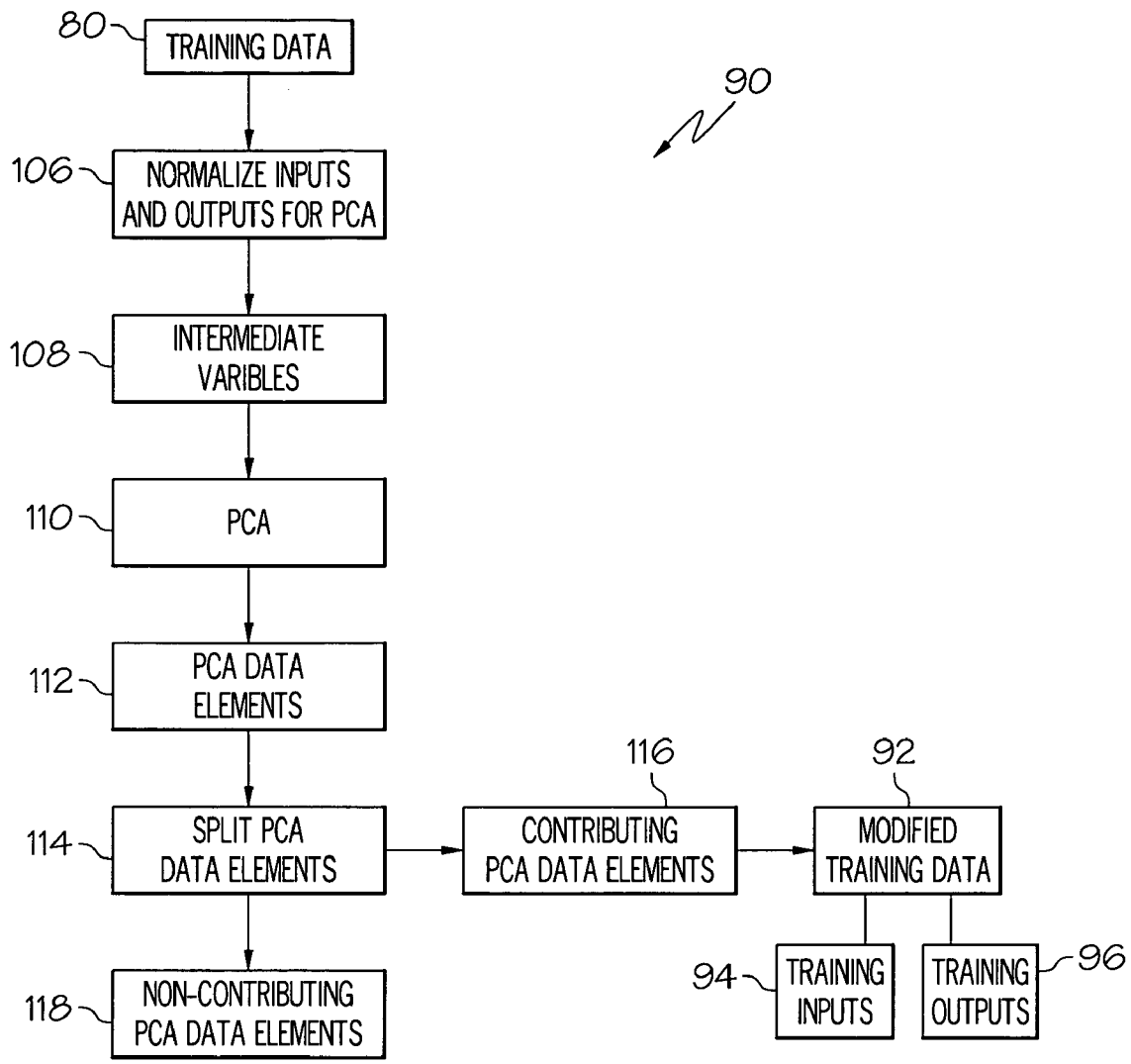
FIG. 6 is a flowchart depicting, in more detail, another embodiment of a portion of the process of FIG. 4, namely generating modified training data.

Turning now to FIGS. 5 and 6, two preferred embodiments are provided for step 90, generating the modified training data 92. In the first embodiment, depicted in FIG. 5, in step 104 the input variables (namely the VCS 10 operating variables 48) and the output variable (namely the VCS 10 refrigerant charge level 50) are normalized, preferably such that each falls in the interval [−1, 1]. Such normalization can be conducted, for example, using mathematical software such as the Matlab Toolbox. In this first preferred embodiment, the normalization in step 104 is conducted using the following equation:

$$p_n = 2*(p-\min(p))/(\max(p)-\min(p))-1,$$

where p is the original data value for a particular variable, $p_n$ is the corresponding normalized data value, $\min(p)$ is the minimum value of p in the training data 80, and $\max(p)$ is the maximum value of p in the training data 80. In this first embodiment, step 104 directly yields modified training data 92, which includes a plurality of training inputs 94 and training outputs 96. In this embodiment, the training inputs 94 consist of normalized values of the VCS 10 operating variables 48, and the training outputs consist of normalized values of the VCS 10 refrigerant charge level 50.

Alternatively, in a most preferred embodiment, depicted in FIG. 6, a different normalization process is used in step 90, utilizing a different normalization equation combined with mathematical principal components analysis (PCA). Specifically, in step 106, the input variables (namely the VCS 10 operating variables 48) and the output variable (namely the VCS 10 refrigerant charge level 50) are normalized for use with PCA analysis, preferably such that the arithmetic mean of each data item is zero and the standard deviation is one. Such normalization can be conducted, for example, using mathematical software such as the Matlab Toolbox. In this most preferred embodiment, the normalization in step 106 is conducted using the following equation:

$$p_n = (p-\text{mean}(p))/\text{std}(p),$$

where p is the original data, mean(p) is the arithmetic mean of p, and std(p) is the standard deviation of p. In this most preferred embodiment, step 106 yields a plurality of intermediate variables 108, consisting of normalized values of the VCS 10 operating variables 48 and the VCS 10 refrigerant charge level 50.

Figure 7:
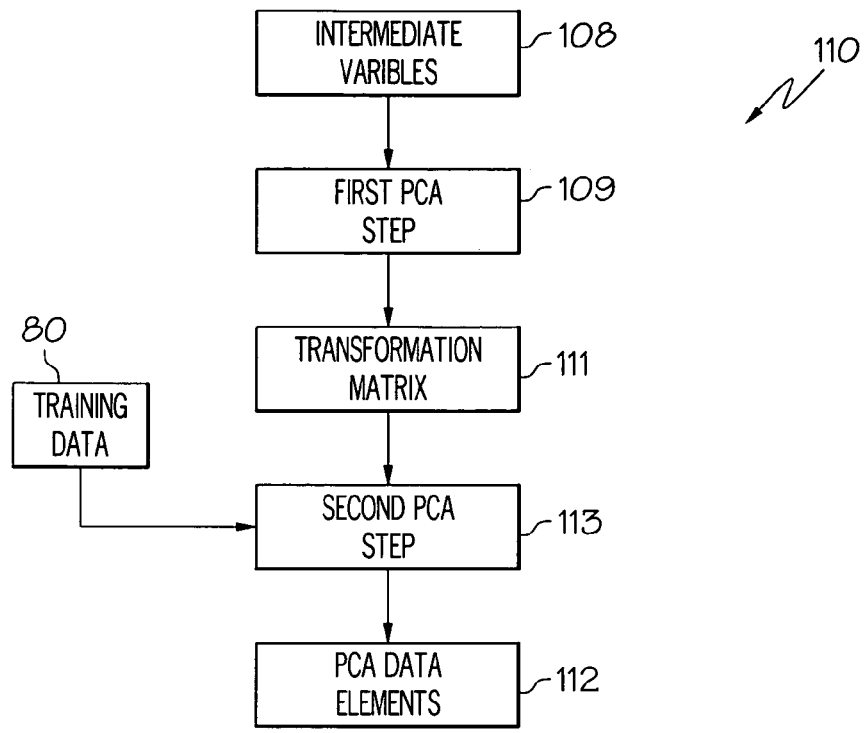
FIG. 7 is a flowchart generating, in more detail, an embodiment of a portion of the process of FIG. 6, namely involving PCA operations.

Next, and still referring to the most preferred embodiment of FIG. 6, in step 110 mathematical principal components analysis (PCA) is conducted, using the intermediate variables 108 from step 106 as inputs, in generating a plurality of PCA data elements 112. The PCA is conducted in order to reduce the dimensionality of the training data 80, and to obtain data that is minimally correlated with one another. As shown in FIG. 7, the PCA step 110 preferably includes a first PCA step 109, in which a transformation matrix 111 is generated utilizing the intermediate variables 108. Next, in second PCA step 113, the transformation matrix 111 is utilized along with the training data 80, preferably using multiplication, thereby generating the PCA data elements 112. The resulting PCA data elements 112 are linear combinations of the intermediate variables 108.

Next, and referring back to FIG. 6, in step 114 an evaluation is conducted comparing the various PCA data elements' 112 contribution to the total variation on the training data 80, and the PCA data elements 112 are accordingly split into contributing PCA data elements 116 and non-contributing PCA data elements 118. Specifically, in step 114, the PCA data elements 112 that are deemed to contribute substantially to the variation in the training data 80 are labeled as contributing PCA data elements 116, and the PCA data elements 112 that are deemed to not contribute substantially to the variation in the training data 80 are labeled as non-contributing PCA data elements 118. The contributing PCA data elements 116 determined from step 114 are then used as the modified training data 92, with training inputs 94 and training outputs 96 for use in training the neural network model 42 in steps 98 and 100 as shown in FIG. 4.

Accordingly, the nature of the modified training data 92 will vary, depending on which of the above-described embodiments is used in step 90. It will also be appreciated that variations of these embodiments may be used, resulting in still different modified training data 92. However, regardless of the particular formulation of the modified training data 92, the modified training data 92 is used to train the neural network model 42 in steps 98 and 100.

Figure 8:
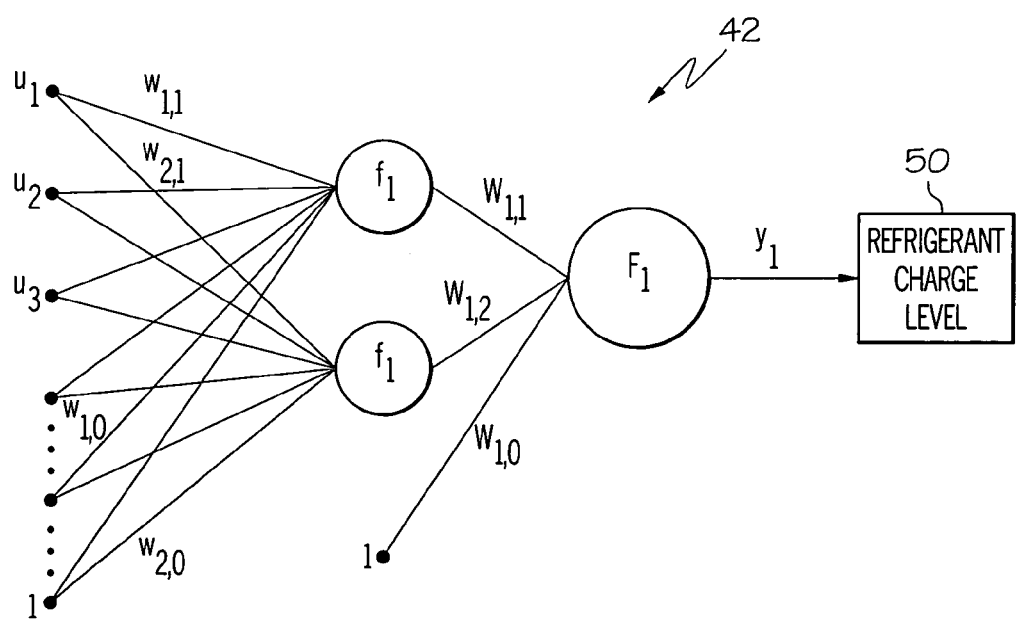
FIG. 8 is a schematic drawing of an exemplary neural network model used in the process of FIG. 2.

Returning now to FIG. 4, in step 98 the neural network model 42 is set up, the training inputs 94 and training outputs 96 are provided to the neural network model 42, and a training algorithm is initiated for the neural network model 42. Preferably a feed-forward, nonlinear neural network model 42 is used, such as the neural network model depicted in FIG. 8, which includes a plurality of inputs, a single output, and one hidden layer. However, it will be appreciated that any one of a number of different types of neural network models can be used for the neural network model 42. Regardless of the particular type of model used, the neural network model 42 is setup, and a training algorithm is initiated, in step 98.

In addition, as shown in FIG. 4, in step 100 the training inputs 94 can be processed through the neural network model 42, thereby generating predicted normalized values of the VCS 10 refrigerant charge level 50. Then, in step 102, the predicted normalized values of the VCS 10 refrigerant charge level 50 can be denormalized by postprocessing the normalized predicted values of the refrigerant charge level 50, resulting in denormalized predicted values of the VCS refrigerant charge level 50.

The denormalization process of step 102 preferably utilizes different equations depending on the particular embodiment used for step 90, generating modified training data. For example, when the embodiment from FIG. 5 is used for step 90, without use of PCA, the denormalization process of step 102 preferably uses the following equation:

$$p=0.5(p_n+1)*(\max(p)-\min(p))+\min(p).$$

Alternatively, when the embodiment from FIG. 6 is used for step 90, using PCA, the denormalization process of step 102 preferably uses the following equation:

$$p=\text{std}(p)*p_n+\text{mean}(p).$$

Figure 9:
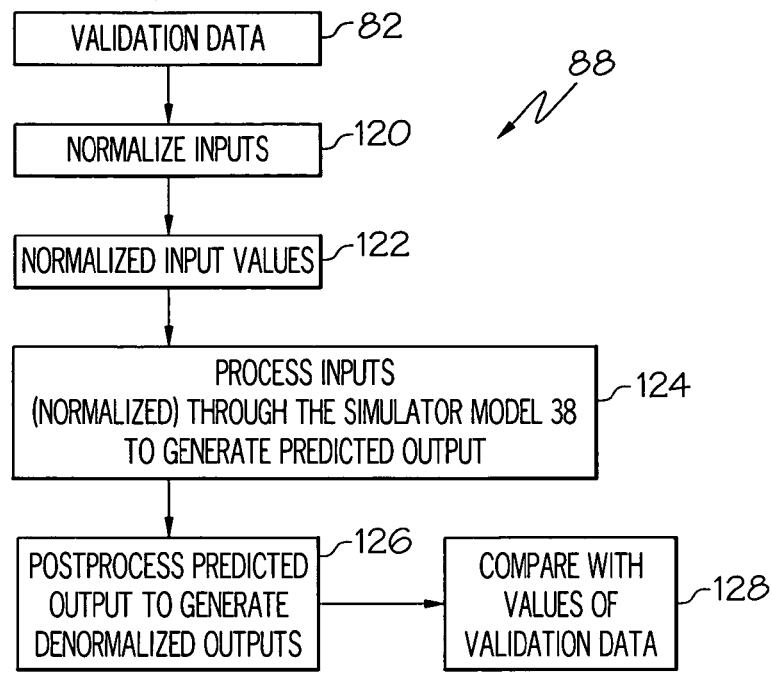
FIG. 9 is a flowchart depicting, in more detail, an embodiment of a portion of the process of FIG. 2, namely validating the simulator model.
Figure 10:
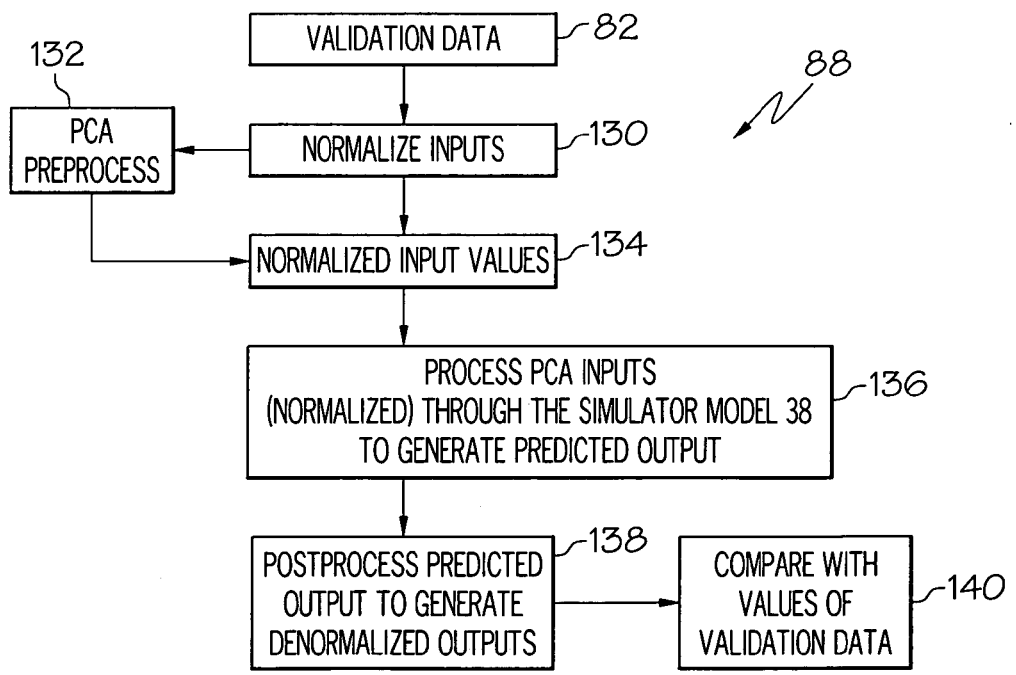
FIG. 10 is a flowchart depicting, in more detail, another embodiment of a portion of the process of FIG. 2, namely validating the simulator model.

Returning now to FIG. 2, the simulator model 38 is generated in step 86 utilizing the results of step 84, training the neural network model 42. The simulator model 38 is capable of determining the refrigerant charge level 50 of a VCS 10 in operation, based on a plurality of VCS 10 operating variables 48. Next, in step 88, the simulator model 38 can be validated using the validation data 82 generated from step 78, as mentioned above. FIGS. 9 and 10 depict different preferred embodiments for step 88, validating the simulator model 38, and with reference thereto will now be described in more detail.

FIG. 9 depicts a first embodiment for step 88, validating the simulator model 32, without using PCA. In this first embodiment of FIG. 9, in step 120 the values of the VCS 10 operating variables 48 from the validation data 82 are normalized, in order to generate normalized input values 122. In this first embodiment, similar to the process depicted in FIG. 5, the data is normalized in step 120 such that each falls in the interval [−1, 1], using the following equation:

$$p_n=2*(p-\min(p))/(\max(p)-\min(p))-1,$$

where p is the original data value for a particular variable, $p_n$ is the corresponding normalized data value, min(p) is the minimum value of p in the validation data 82, and max(p) is the maximum value of p in the validation data 82. In this first embodiment, step 120 preferably yields normalized input values 122 of each of the VCS 10 operating variables 48.

Next, in step 124 of FIG. 9, the normalized input values 122 are processed through the simulator model 38, thereby generating predicted normalized values of the VCS 10 refrigerant charge level 50. Then, in step 126, the predicted normalized values of the VCS 10 refrigerant charge level 50 are denormalized by postprocessing the normalized predicted values of the refrigerant charge level 50, resulting in denormalized predicted values of the VCS refrigerant charge level 50. The denormalization process of step 126 preferably utilizes the following equation:

$$p=0.5(p_n+1)*(\max(p)-\min(p))+\min(p).$$

Next, in step 128 of FIG. 9, the denormalized predicted values of the VCS 10 refrigerant charge level 50 from step 126 can then be compared with values of the VCS 10 refrigerant charge level 50 from the validation data 82, in order to validate the simulator model 38.

FIG. 10 depicts a second, most preferred embodiment for step 88, validating the simulator model 32, using PCA. In this most preferred embodiment of FIG. 10, in step 130 the values of the VCS 10 operating variables 48 from the validation data 82 are normalized. In this most preferred embodiment, similar to the process depicted in FIG. 6, the normalization in step 130 is preferably conducted such that the arithmetic mean of each data item is zero and the standard deviation is one, utilizing the following equation:

$$p_n=(p-\text{mean}(p))/\text{std}(p),$$

where p is the original data, mean(p) is the arithmetic mean of p, and std(p) is the standard deviation of p, all in the validation data 82.

Next, in step 132, a PCA preprocess is conducted, preferably multiplying the resulting data from step 130 by the transformation matrix 111 shown in FIG. 7 and obtained in step 110. The combined steps 130 and 132 in this most preferred embodiment generate PCA normalized input values 134 for use in validating the simulator model 38.

Next, in step 136 of FIG. 10, the PCA normalized input values 134 are processed through the simulator model 38, thereby generating predicted normalized values of the VCS 10 refrigerant charge level 50. Then, in step 138, the predicted normalized values of the VCS 10 refrigerant charge level 50 are denormalized by postprocessing the normalized predicted values of the refrigerant charge level 50, resulting in denormalized predicted values of the VCS refrigerant charge level 50. In the most preferred embodiment of FIG. 10, the denormalization process of step 138 preferably utilizes the following equation:

$$p = \text{std}(p) * p_n + \text{mean}(p).$$

Next, in step 140 of FIG. 10, the denormalized predicted values of the VCS 10 refrigerant charge level 50 from step 138 can then be compared with values of the VCS 10 refrigerant charge level 50 from the validation data 82, in order to validate the simulator model 38.

It will be appreciated that the simulator model 38 can also be validated using other steps, and in some cases the simulator model 38 may not require validation. Regardless of the steps, if any, used to validate the simulator model 38, the simulator model 38 can be used to process current data in order to determine the current refrigerant charge level values, as set forth below.

Figure 11:
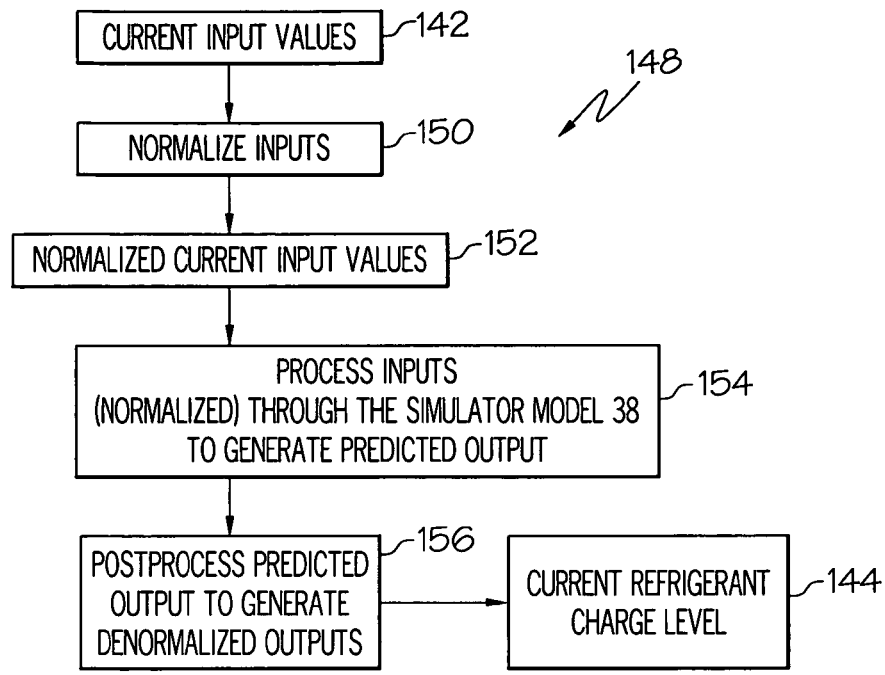
FIG. 11 is a flowchart depicting, in more detail, an embodiment of a portion of the process of FIG. 2, namely determining a current refrigerant charge level using the simulator model.
Figure 12:
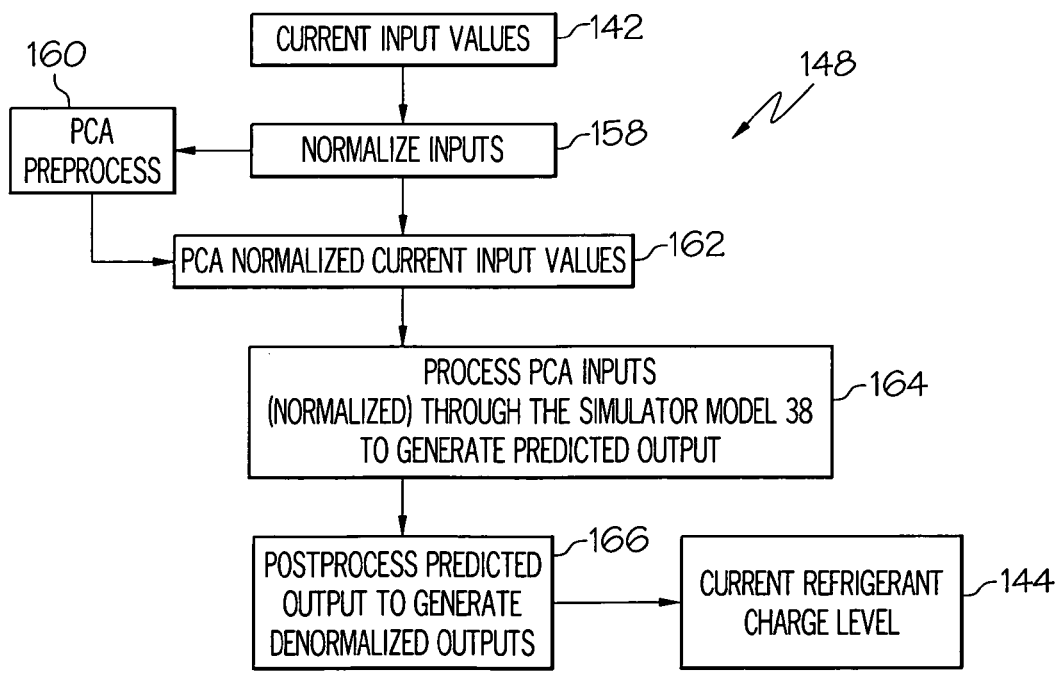
FIG. 12 is a flowchart depicting, in more detail, another embodiment of a portion of the process of FIG. 2, namely determining a current refrigerant charge level using the simulator model.

As referenced above, and returning again to FIG. 2, the simulator model 38 can be used to process current input values 142 of the VCS 10 operating variables 48, and to determine the current refrigerant charge level value 144 therefrom. As shown in FIG. 2, the current input values 142 can be provided in step 146 to the simulator model 38, for example from a VCS 10 that is currently in operation. Next, in step 148, the simulator model 136 processes the current input values 142, in order to determine the current refrigerant charge level value 144 of the VCS 10 in operation. FIGS. 11 and 12 depict multiple preferred embodiments for step 148, determining the current VCS 10 refrigerant charge level value 144 from the current input values 142, and with reference thereto will now be described.

FIG. 11 depicts a first embodiment for step 148, determination of current refrigerant charge level 144, without using PCA, similar to the first embodiment of the validation process depicted in FIG. 9. As depicted in FIG. 11, in step 150 the current input values 142 of the VCS 10 operating variables 48 are normalized, in order to generate normalized current values 152, preferably such that each falls in the interval [−1, 1], and preferably using the following equation:

$$p_n = 2*(p - \min(p))/(\max(p) - \min(p)) - 1,$$

where p is the original data value for a particular variable, $p_n$ is the corresponding normalized data value, min(p) is the minimum value of p from the current input values 142, and max(p) is the maximum value of p from the current input values 142. Step 150 preferably yields normalized current input values 152 of each of the VCS 10 operating variables 48.

Next, in step 154 of FIG. 11, the normalized current input values 152 are processed through the simulator model 38, thereby generating predicted normalized current values of the VCS 10 refrigerant charge level 50. Then, in step 156, the predicted normalized current values of the VCS 10 refrigerant charge level 50 from step 154 are denormalized by postprocessing the normalized predicted values of the refrigerant charge level 50, resulting in a denormalized predicted current value 144 of the VCS refrigerant charge level 50. The denormalization process of step 156 preferably utilizes the following equation:

$$p = 0.5(p_n + 1)*(\max(p) - \min(p)) + \min(p).$$

FIG. 12 depicts a second, most preferred embodiment for step 148, determination of current refrigerant charge level 144, using PCA, similar to the most preferred embodiment of the validation process depicted in FIG. 10. As depicted in FIG. 12, in step 158 the current input values 142 of the VCS 10 operating variables 48 are normalized, preferably such that the arithmetic mean of each data item is zero and the standard deviation is one, utilizing the following equation:

$$p_n = (p - \text{mean}(p))/\text{std}(p),$$

where p is the original data, mean(p) is the arithmetic mean of p, and std(p) is the standard deviation of p, preferably all from the current input values 142.

Next, in step 160, a PCA preprocess is conducted, preferably multiplying the resulting data from step 158 by the transformation matrix 111 shown in FIG. 7 and obtained in step 110. The combined steps 158 and 160 in this most preferred embodiment generate PCA normalized input values 162 for use in generating the current refrigerant charge level value 144.

Next, in step 164 of FIG. 12, the PCA normalized current input values 162 are processed through the simulator model 38, thereby generating predicted normalized current values of the VCS 10 refrigerant charge level 50. Then, in step 166, the predicted normalized current values of the VCS 10 refrigerant charge level 50 from step 164 are denormalized by postprocessing the normalized predicted values of the refrigerant charge level 50, resulting in a denormalized predicted current value 144 of the VCS refrigerant charge level 50. The denormalization process of step 166 preferably utilizes the following equation:

$$p = \text{std}(p) * p_n + \text{mean}(p).$$

The process 36 and the simulator model 38 can be very useful tools in determining the refrigerant charge level 50 of a VCS 10. By determining the refrigerant charge level 50, the process 36 and the simulator 38 enable aircraft operators to ascertain, with a high degree of certainty, whether the refrigerant charge level should be adjusted, in which direction the adjustment (if any) should be made, and the magnitude of any such adjustment. Moreover, through the steps of the process 36, including the use of PCA, a larger number of inputs can be used in determining the VCS 10 refrigerant charge level 50, and collinearity between input variables can be substantially reduced, further increasing accuracy and performance. Moreover, different embodiments of the process 36, such as the preferred embodiment of step 62 depicted in FIG. 3, involving averaging the inputs, can result in even more accurate results.

In addition, it is noted that, in experimentally employing this embodiment of step 62 as depicted in FIG. 3, certain VCS 10 operating variables 48 (namely TCDO, TEFO, TCDRI, PCPI, PCPO, and subcooling temperature) were shown to have a larger impact on the VCS 10 refrigerant charge level 50. Accordingly, in the various steps of the process 36, these particular variables, and/or other well-performing VCS 10 operating variables 48 under other embodiments and experimental conditions, may be used as the only VCS 10 operating variables 48, or may be given greater weight as compared with other possible VCS 10 operating variables 48.

It will be appreciated that the process 36 and the simulator model 38, and/or components thereof, can be used in any one of a number of different applications. In addition, the process 36, the simulator model 38, and/or components thereof, can be implemented in a wide variety of platforms including, for example, any one of numerous computer systems.

Figure 13:
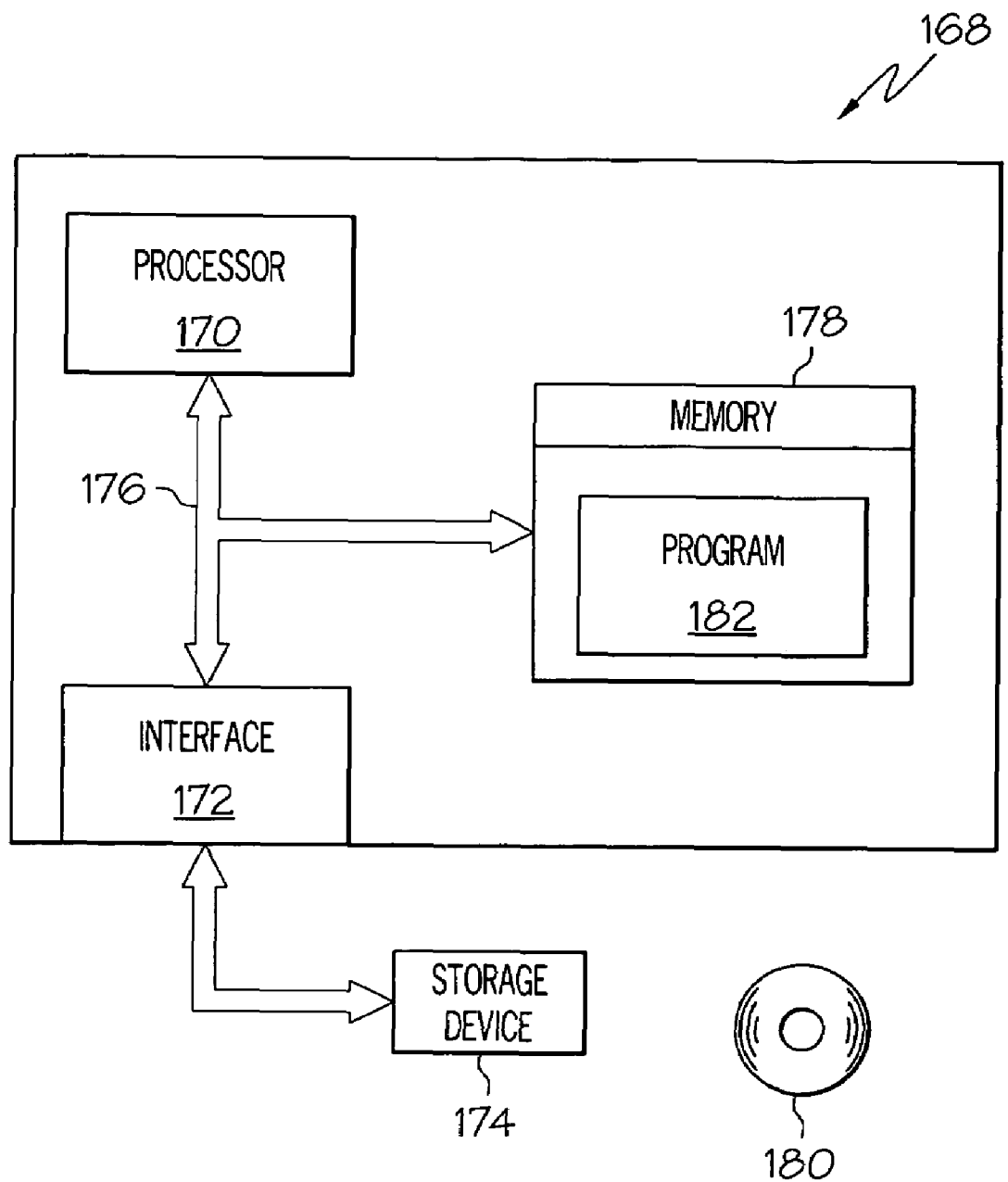
FIG. 13 is a schematic drawing of an exemplary computer system that can be used to implement the process of FIG. 2, the simulator model generated therein, and/or components thereof.

Turning now to FIG. 13, an exemplary computer system 168 is illustrated. Computer system 168 illustrates the general features of a computer system that can be used to implement the process 36, the simulator model 38, and/or components thereof. Of course, these features are merely exemplary, and it should be understood that the process 36, the simulator model 38, and/or components thereof can be implemented using different types of hardware that can include more or different features. It should be noted that the computer system 168 can be implemented in many different environments, such as within a particular apparatus or system, or remote from a particular apparatus or system. The exemplary computer system 168 includes a processor 170, an interface 172, a storage device 174, a bus 176, and a memory 178.

The processor 170 performs the computation and control functions of the computer system 168. The processor 170 may comprise any type of processor, include single integrated circuits such as a microprocessor, or may comprise any suitable number of integrated circuit devices and/or circuit boards working in cooperation to accomplish the functions of a processing unit. In addition, the processor 170 may comprise multiple processors implemented on separate systems. In addition, the processor 170 may be part of an overall system for an apparatus or process. During operation, the processor 170 executes the programs contained within the memory 178 and as such, controls the general operation of the computer system 168.

The memory 178 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 178 may be a single type of memory component, or it may be composed of many different types of memory components. In addition, the memory 178 and the processor 170 may be distributed across several different computers that collectively comprise the computer system 168. For example, a portion of the memory 178 may reside on a computer within a particular apparatus or process, and another portion may reside on a remote computer.

The bus 176 serves to transmit programs, data, status and other information or signals between the various components of the computer system 168. The bus 176 can be any suitable physical or logical means of connecting computer systems and components. This includes, but is not limited to, direct hard-wired connections, fiber optics, infrared and wireless bus technologies.

The interface 172 allows communication to the computer system 168, and can be implemented using any suitable method and apparatus. It can include one or more network interfaces to communicate to other systems, terminal interfaces to communicate with technicians, and storage interfaces to connect to storage apparatuses such as the storage device 174. The storage device 174 can be any suitable type of storage apparatus, including direct access storage devices such as hard disk drives, flash systems, floppy disk drives and optical disk drives. As shown in FIG. 13, the storage device 174 can comprise a disk drive device that uses disks 180 to store data.

In accordance with a preferred embodiment, the computer system 168 includes a program 182 for use in implementing the process 36, the simulator model 38, and/or components thereof. During operation, the program 182 is stored in the memory 178 and executed by the processor 170. As one example implementation, the computer system 168 may also utilize an Internet website, for example for providing or maintaining data or performing operations thereon.

It should be understood that while the embodiment is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 180), and transmission media such as digital and analog communication links.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method of developing a model for determining refrigerant charge in a vapor compressor system (VCS) of an aircraft, the method comprising the steps of:
   (a) receiving, in a processor, a data set generated from historical data representative of a plurality of VCS operating conditions over time, the generated data set comprising a plurality of data points, each data point comprising:
      (i) one or more values for a plurality of VCS operating variables reflecting operation of the VCS over a specific time period and corresponding to a specific set of operating conditions; and
      (ii) corresponding values for VCS refrigerant charge over the same time period; and
   (b) the processor processing the data to:
      (i) identify one or more steady-state data points in the generated data set, each steady-state data point corresponding to steady-state operation of the VCS;
      (ii) form a revised data set that includes at least the steady-state data points;
      (iii) use principal components analysis (PCA) to derive values for a plurality of minimally correlated input variables from the values for the plurality of VCS operating variables in the revised data set;
      (iv) supply the derived values for the plurality of minimally correlated input variables, and the corresponding values for the VCS refrigerant charge in the revised data set, to a nonlinear neural network model; and
      (v) derive a simulator model characterizing a relationship between the plurality of minimally correlated input variables and the VCS refrigerant charge using the nonlinear neural network model.

2. The method of claim 1, further comprising the steps of the processor processing the data to:
dividing the steady-state data points according to particular ranges of VCS operating conditions, thereby creating a revised data subset for each range of VCS operating conditions; and
calculating average values for the plurality of VCS operating variables for each data subset, for use in deriving the values for the plurality of minimally correlated input variables.

3. The method of claim 1, further comprising the step of the processor processing the data to:
filtering the values for the VCS refrigerant charge in the revised data set.

4. The method of claim 1, further comprising the steps of the processor processing the data to:
divide the steady-state data points into training data and validation data;
remove the validation data from the revised data set, so that the revised data set comprises only the training data for use in step (d); and
test the derived simulator model derived in step (f), utilizing the validation data.

5. The method of claim 1, further comprising the step of the processor processing the data to:
determine the VCS refrigerant charge, utilizing the derived simulator model.

6. The method of claim 1, wherein the plurality of VCS operating variables are selected from the group consisting of motor speed, motor power, compressor inlet temperature (TCPI), condenser outlet temperature (TCDO), evaporator outlet temperature (TEFO), condenser ram inlet temperature (TCDRI), compressor inlet pressure (PCPI), compressor outlet pressure (PCPO), subcooling temperature, and evaporator inlet temperature (TEVI).

7. The method of claim 1, wherein the plurality of VCS operating variables are selected from the group consisting of motor power, TCDO, TEFO, TCDRI, PCPI, PCPO, and subcooling temperature.

8. The method of claim 1, wherein the nonlinear neural network model is a feed forward neural network model with one hidden layer.

9. A method for developing a model for determining refrigerant charge in a vapor compressor system (VCS) of an aircraft, the method comprising the steps of:
(a) receiving, in a processor, a data set generated from historical data representative of a plurality of VCS operating conditions over time, the generated data set comprising a plurality of data points, each data point comprising:
(i) one or more values for a plurality of VCS operating variables reflecting operation of the VCS over a specific time period and corresponding to a specific set of operating conditions; and
(ii) corresponding values for VCS refrigerant charge over the same time period; and
(b) the processor processing the data to:
(i) identify one or more steady-state data points in the generated data set, each steady-state data point corresponding to steady-state operation of the VCS;
(ii) form a revised data set that includes at least the steady-state data points;
(iii) divide the steady-state data points according to particular ranges of VCS operating conditions, thereby creating a revised data subset for each range of VCS operating conditions;
(iv) calculate average values for the plurality of VCS operating variables for each data subset;
(v) supply the average values for the plurality of VCS operating variables to a nonlinear neural network model;
(vi) derive a simulator model characterizing a relationship between the plurality of VCS operating variables and the VCS refrigerant charge using the nonlinear neural network model;
(vii) use principal components analysis (PCA) to derive values for a plurality of minimally correlated input variables from the average values for the plurality of VCS operating variables in the revised data set; and
(viii) supply the derived values for the plurality of minimally correlated input variables, and corresponding values for the VCS refrigerant charge in the revised data set, to a nonlinear neural network model.

10. The method of claim 9, further comprising the step of the processor processing the data to:
filtering the values for the VCS refrigerant charge in the revised data set.

11. The method of claim 9, further comprising the steps of the processor processing the data to:
dividing the steady-state data points into training data and validation data;
removing the validation data from the revised data set, so that the revised data set comprises only the training data for use in deriving the simulator model; and
testing the derived simulator model derived in step (g), utilizing the validation data.

12. The method of claim 9, further comprising the step of the processor processing the data to:
determining the VCS refrigerant charge, utilizing the simulator model.

13. The method of claim 9, wherein the plurality of VCS operating variables are selected from the group consisting of motor speed, motor power, compressor inlet temperature (TCPI), condenser outlet temperature (TCDO), evaporator outlet temperature (TEFO), condenser ram inlet temperature (TCDRI), compressor inlet pressure (PCPI), compressor outlet pressure (PCPO), subcooling temperature, and evaporator inlet temperature (TEVI).

14. The method of claim 9, wherein the plurality of VCS operating variables are selected from the group consisting of motor power, TCDO, TEFO, TCDRI, PCPI, PCPO, and subcooling temperature.

15. The method of claim 9, wherein the nonlinear neural network model is a feed forward neural network model with one hidden layer.

16. An apparatus comprising:
(a) a processor;
(b) a memory coupled to the processor; and
(c) a program residing in memory and being executed by the processor, the program configured to provide a model for determining a refrigerant charge in a vapor compressor system (VCS) of an aircraft via a model through at least the following steps:
(i) generating a data set from historical data representative of a plurality of VCS operating conditions over time, the generated data set comprising a plurality of data points, each data point comprising one or more values for a plurality of VCS operating variables reflecting operation of the VCS over a specific time period, and corresponding values for VCS refrigerant charge over the same time period;

(ii) identifying one or more steady-state data points in the generated data set, each steady-state data point corresponding to steady-state operation of the VCS;

(iii) forming a revised data set that includes at least the steady-state data points;

(iv) using principal components analysis (PCA) to derive values for a plurality of minimally correlated input variables from the values for the plurality of VCS operating variables in the revised data set;

(v) supplying the derived values for the plurality of minimally correlated input variables, and the corresponding values for the VCS refrigerant charge in the revised data set, to a nonlinear neural network model; and (vi) deriving a simulator model characterizing a relationship between the plurality of minimally correlated input variables and the VCS refrigerant charge using the simulator model.

17. The apparatus of claim 16, wherein the processor is operable to implement the derived simulator model.

* * * * *